Figure 1:
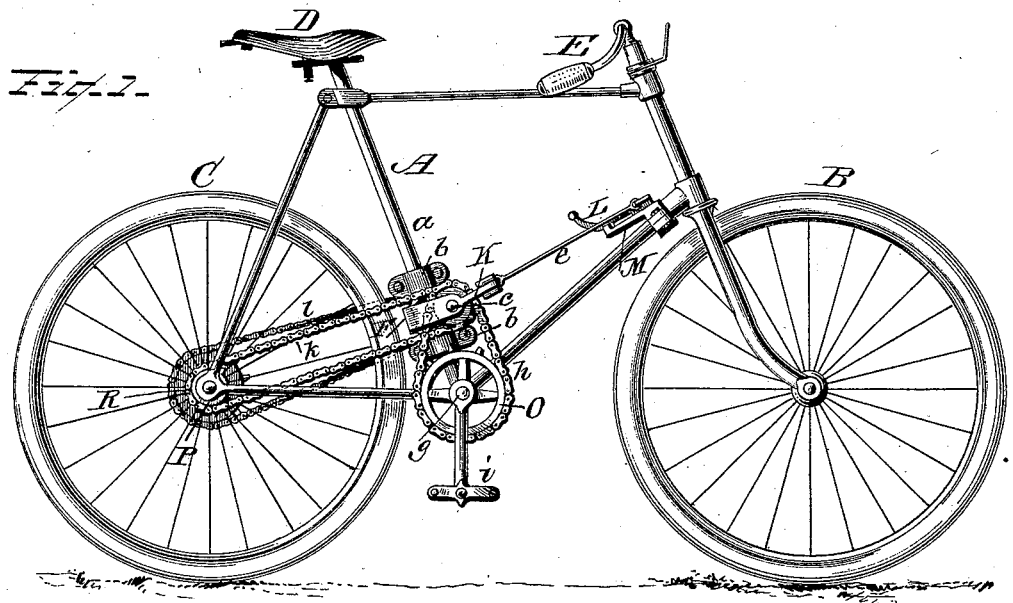

(No Model.)

D. LIPPY & I. E. FINFROCK.
DRIVING GEAR FOR BICYCLES.

No. 528,956. Patented Nov. 13, 1894.

Witnesses
D. J. Williamson
J. Goddard

Inventors
David Lippy,
Ira Elmer Finfrock.
per Chas. H. Fowler
Attorney.

UNITED STATES PATENT OFFICE.

DAVID LIPPY AND IRA ELMER FINFROCK, OF MANSFIELD, OHIO.

DRIVING-GEAR FOR BICYCLES.

SPECIFICATION forming part of Letters Patent No. 528,956, dated November 13, 1894.

Application filed June 26, 1894. Serial No. 515,742. (No model.)

*To all whom it may concern:*

Be it known that we, DAVID LIPPY and IRA ELMER FINFROCK, citizens of the United States, residing at Mansfield, in the county of Richland and State of Ohio, have invented certain new and useful Improvements in Driving-Gear for Bicycles; and we do hereby declare that the following is a full, clear, and exact description of the same, reference being had to the annexed drawings, making a part of this specification, and to the letters of reference marked thereon.

The present invention has relation to that class of differential speed mechanism for bicycles in which provision is made for changing the speed and power of the machine to adapt it to the nature or character of the road over which the machine is propelled without the necessity of the rider dismounting and also enabling the pedal-shaft to be disconnected with the gearing when it is desired to use the machine in "coasting" on down grades.

It is the object of the invention to improve this differential speed-mechanism whereby both lightness, strength and durability are secured and the mechanism be simple in its construction and easily operated by the rider without dismounting and while the machine is in motion, which objects are attained by the mechanism substantially as shown in the drawings and hereinafter described and claimed.

Figure 2:
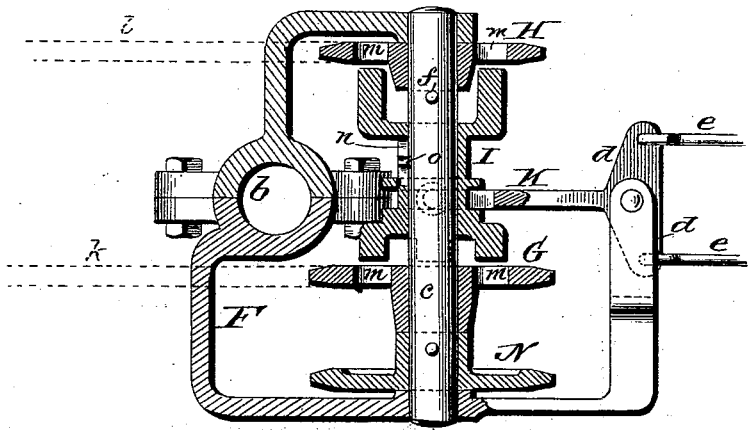

Figure 1 of the drawings represents a side elevation of a bicycle with our improved differential speed mechanism applied thereto. Fig. 2 represents a plan view of the mechanism on an enlarged scale and partly in section.

In the accompanying drawings A represents the frame of the machine which may be of any desirable shape and construction, and B C represent the front and rear wheels respectively, said frame having the usual saddle D and provided with the handle bar E, all of which parts may be of the usual construction.

The saddle supporting bar $a$ of the bicycle-frame has detachably connected to it a suitable sectional bracket as shown at F, which bracket supports a part of the gearing or differential speed mechanism which forms the subject of our invention. This sectional bracket F has sectional coupling-collars $b$ with suitable fastenings to connect them around the saddle supporting bar $a$ and hold the bracket stationary and firmly upon the bar. The bracket may be of any suitable construction and forms bearings for the ends of a shaft $c$ upon which are loosely mounted the sprocket-wheels G H, and between these wheels is located a double clutch I which is slidable upon the shaft and operated by means of a forked-lever K pivoted to the bracket. This lever has laterally extending arms $d$ to which are connected rods $e$, and these rods in turn are connected to a shifting-lever L pivoted to a bracket M upon the frame of the bicycle and in convenient reach of the rider, the bracket being notched to hold the shifting-lever in its adjusted position when moved to the right or left.

Any suitable and well known means may be employed for operating the clutch in place of that shown.

The sprocket-wheel H is prevented from sliding lengthwise of the shaft by means of the pin $f$ but is free to revolve independently thereof or remain stationary when not engaged with the clutch.

A sprocket-wheel N is suitably keyed to the shaft $c$ and connects with the large sprocket-wheel O upon the pedal-shaft $g$ through the medium of a sprocket chain $h$, the usual pedals $i$ being connected with the shaft by which it is operated.

The bicycle-wheel C has upon its opposite sides the large and the small sprocket-wheels P R respectively, and over the wheel P passes the sprocket-chain $k$ and connects with the sprocket-wheel G.

The sprocket-wheel R upon the opposite side of the bicycle-wheel connects with the sprocket-wheel H through the medium of the sprocket-chain $k$.

The clutch I has a longitudinal slot $n$ in which projects a pin $o$ upon the shaft $c$ so as to prevent the clutch from turning thereon. Any suitable means may be provided to prevent the clutch from turning upon the shaft as found most preferable. The change of speed to power is attained by the clutch engaging with the openings or holes in the sprocket-wheels as the case may be.

When the clutch is disconnected with both the sprocket-wheels, as shown in Fig. 2 of the drawings, the shaft and sprocket wheels as well as the pedal-shaft will remain stationary, thereby enabling the machine to be used when desired to "coast" on a down grade.

The bracket F provides a very convenient device for supporting the differential speed mechanism, enabling it to be readily attached to the frames of any of the bicycles known as the "safety," and can be quickly and conveniently disconnected when found necessary.

Having now fully described our invention, what we claim as new, and desire to secure by Letters Patent, is—

In a driving gear for bicycles, a sectional bracket having a coupling collar for connecting it to the saddle supporting bar, a shaft having its bearings in said bracket, two sprocket wheels loosely mounted on the shaft, a third sprocket wheel rigidly connected thereto, a sliding clutch adapted to engage with the loosely mounted wheels, sprocket-chains engaging therewith and with a small and a large sprocket wheel upon the hub of the driving wheel, and a sprocket-chain engaging with a sprocket-wheel which is rigidly connected to the shaft of the bracket and also engaging with the sprocket wheel upon the pedal shaft, substantially as and for the purpose set forth.

In testimony that we claim the above we have hereunto subscribed our names in the presence of two witnesses.

DAVID LIPPY.
IRA ELMER FINFROCK.

Witnesses:
BURTON J. OUSTINE,
W. H. GIFFORD.